June 21, 1938. C. J. P. SCHRØDER 2,121,411
GENERATOR FOR SOUND OSCILLATIONS FOR MEASURING
DISTANCE ACCORDING TO THE ECHO PRINCIPLE
Filed May 3, 1935

Patented June 21, 1938

2,121,411

UNITED STATES PATENT OFFICE 2,121,411

GENERATOR FOR SOUND OSCILLATIONS FOR MEASURING DISTANCE ACCORDING TO THE ECHO PRINCIPLE

Carl Johan Petersen Schrøder, Holte, Denmark

Application May 3, 1935, Serial No. 19,747
In Denmark May 9, 1934

3 Claims. (Cl. 181—0.5)

My invention relates to improvements in generators for sound oscillations for measuring distance according to the echo principle by emitting sound oscillations with continuously varied, preferably periodically continuously varied frequency and utilizing the difference in frequency between these oscillations and the reflected oscillations for determining the distance. The frequency of the emitted oscillations may be over the audible limit and the variation in frequency is then preferably so adjusted in relation to the distance to be measured that the interference oscillations are audible.

The object of my invention is to provide simple and efficient means for use in a generator of the kind set forth.

In the following specification the invention is more exactly explained with reference to the accompanying drawing.

Figure 1:
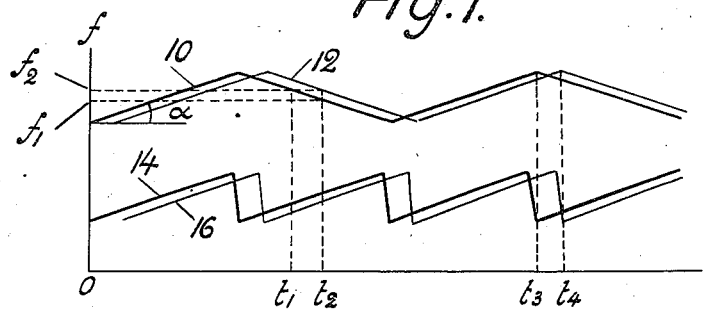
Figure 1 is a diagram for illustrating the method.

In Figure 1 the curve 10 indicates oscillations, the frequency $f$ of which is laid down as ordinates. The frequency alternately increases gradually and decreases gradually with the time $t$ in a periodical manner, the time being laid down as abscissæ. When such oscillations are emitted they will be reflected from a reflecting surface to the place of emission as the curve 12, the time lag $t_2-t_1$ at any time will be proportionate to the distance to the reflecting surface. At the place of emission substantially continuously interference oscillations will appear at the frequency $f_2-f_1$, these oscillations being detuned periodically only in the intervals $t_3-t_4$. As a constant relation exists between $t_2-t_1$ and $f_2-f_1$ the interference frequency (the beat frequency) will be proportionate to the distance to the reflecting surface, it being supposed that the inclination of curve 10 has a certain constant value $\tan \alpha$.

It will appear from the above that two methods are available for determining the distance. The inclination $\tan \alpha$ of the curve 10 may be maintained at a certain value and the value of the interference frequency may be measured, or $\tan \alpha$ may be altered until a certain interference frequency is obtained, this frequency may be determined by a resonator, e. g. a swingable reed with a certain self-oscillation. In the latter case the distance will be inversely proportionate to $\tan \alpha$.

The emitted oscillations may also have the saw-toothed shape indicated by the curve 14, the frequency periodically and alternately varying slowly in one direction and suddenly decreasing in the opposite direction. In this embodiment the curve 14 indicating the emitted oscillation will constantly lie at one side of the curve 16 indicating the reflected oscillations, in the intervals in which the interference oscillations are utilized. This may be of a practical importance when the reflected oscillations are very weak compared with the emitted oscillations.

It may be remarked that $\tan \alpha$ does not need to have a constant value in each interval as even without this condition it will be possible to judge at any rate alterations in the distance by a pure musical apprehension of the interference.

It has been previously mentioned that it may be suitable to the purpose that the emitted oscillations lie beyond the audible limit and that the interference oscillations are audible. This is especially of importance if it is wished to receive the interference oscillations acoustically, as the variation in amplitude of the said oscillations depends upon the amplitude of the reflected oscillations, which in certain cases may be very weak compared with the amplitude of the emitted oscillations.

As a generator for the emitted oscillations generally any known generator may be used, the frequency of which may be varied continuously, e. g. sirens, swinging reeds, diaphragms controlled for example by means of electron tubes or film tapes, or tuning forks and pipes. As an example of the last named generators may be mentioned the generator for air oscillations described by J. Hartmann in his Danish patent specification No. 25,738 of the 15th March, 1920. In this generator according to my invention the frequency is varied by altering the effective length of the resonance tube. In Figures 2–5 are shown various embodiments of devices for this purpose.

Figure 2:
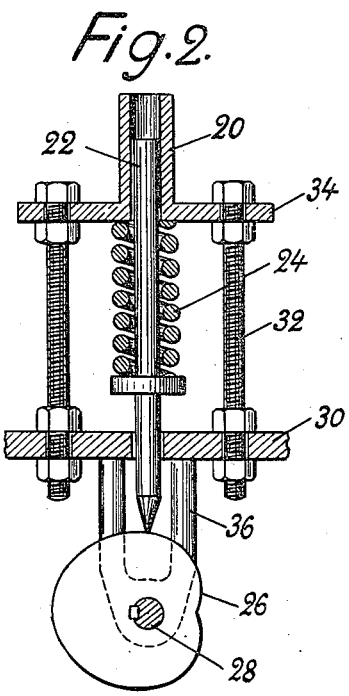
Figures 2–5 show various embodiments of certain parts of generators for producing oscillations with periodically continuously varied frequency.

In Figure 2 20 designates the lower end of the resonance tube which is closed by a displaceable stem or rod 22 which can be moved to and fro in the tube for altering the effective length thereof. With this object in view the lower tapered end of the rod 22 is held in engagement with a cam-disc 26 by a helical spring 24, the cam-disc being splined to a shaft 28 which is revolved at a constant speed. The rod 22 is guided by being carried through an aperture in a plate 30 which by means of bolts 32 is secured to a flange 34 on the tube end 20 and carries journal bearings 36 for the shaft 28.

By rectilinear frequency variation the tube length is to be varied according to a hyperbolic function as the frequency is inversely proportionate to the tube length. For obtaining the curve 10 of Figure 1 the cam-disc 26, therefore, must be a heart-shaped cam composed of two hyperbolic spirals.

If a certain interference frequency is wished at all distances to the reflecting surface the speed of revolution of the shaft 28 is altered until this frequency is obtained. This speed then may serve for determining the distance, the distance being inversely proportionate to the said speed.

Figure 3:
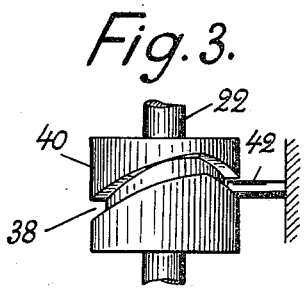

In Figure 3 the axial movement of the rod 22 is obtained by a circumferential groove 38 produced in a collar 40 on the rod, the rod being rotatable about its axis. A fixed pin 42 intermeshes with the groove 38 which has such a shape that by the rotation of the rod 22 the same will be displaced axially.

Figure 4:
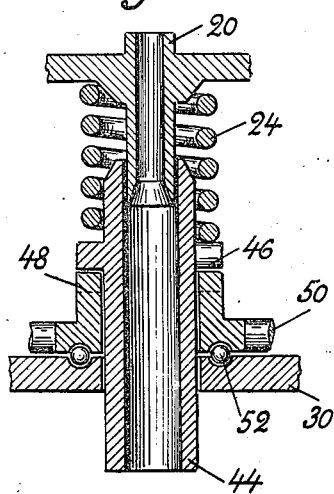

In Figure 4 a tube 44 is arranged displaceable on the tube end 20 in a non-rotatable manner. The tube 44 may be closed or open dependent upon whether a closed or open resonance tube is wished. The spring 24 abuts at its lower end against two studs 46 on the tube 44, thereby holding the studs in engagement with cams 48 of appropriate shape at one end of the hub of a wheel 50 which preferably is held in rotation at a constant speed.

Between the wheel 50 and the plate 30 balls 52 are interposed for antifriction purposes.

Figure 5:
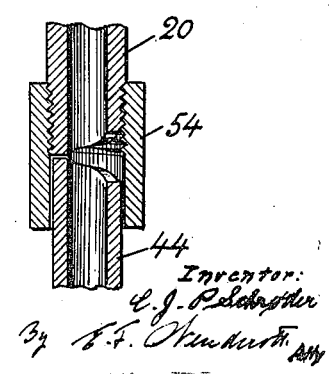

In Figure 5 a tube piece 54 is screwed on and secured to the tube end 20, said tube piece guiding the upper end of the tube 44 which is urged upwardly by a suitable spring not shown on the drawing. The abutting tube ends are cam-shaped so that by revolving the tube 44 about its axis while the tube end 20 is held stationary a periodical alteration of the effective length of the resonance tube will occur.

It should be remarked that the circumstances present in each case determine the length of time in which the oscillations ought to be varied from the lower to the higher frequency or vice versa. The greater the distance to be measured the slower the frequency variation may be made and the longer the variation may be extended.

The method can be applied for measuring distances in arbitrary directions in air or water.

The term "sound oscillations" used in the specification and claims designates oscillations which are propagated by a wave motion in the medium surrounding the generator without regard to whether the oscillations are audible or non-audible.

Having thus fully described my invention I claim as new and desire to secure by Letters Patent:

1. For use in a generator for sound oscillations for measuring the distance to a reflecting surface according to the echo principle, a resonance tube, a device for varying the effective length of said tube and means for periodically moving said device relatively to said tube in order to produce sound oscillations with periodically varied frequency.

2. The device of claim 1, in which there is provided rotating means including a cam surface and a member abutting resiliently against the cam surface and serving to vary the effective length of the resonance tube, the cam surface being so shaped that the frequency of the produced oscillations alternately increases gradually and decreases gradually.

3. The device of claim 1, in which there is provided rotating means including a cam surface and a member abutting resiliently against the cam surface and serving to vary the effective length of the resonance tube, the cam surface being so shaped that the frequency of the produced oscillations alternately varies slowly in one direction and varies suddenly in the opposite direction.

CARL JOHAN PETERSEN SCHRØDER.